INVENTORS:
KONRAD RAUCH
WALTER SCHEIDMEIR 3,528,891
PURIFICATION OF N-ALKANOLS HAVING
FOUR TO FIVE CARBON ATOMS
Konrad Rauch and Walter Schmeidmeir, Limburgerhof,
Pfalz, Germany, assignors to Badische Anilin- &
Soda-Fabrik Aktiengesellschaft, Ludwigshafen (Rhine),
Germany
Filed Oct. 9, 1967, Ser. No. 673,936
Claims priority, application Germany, Oct. 11, 1966,
1,283,216
Int. Cl. B01d *3/36;* C07c *27/30*
U.C. Cl. 203—96                                                    5 Claims

ABSTRACT OF THE DISCLOSURE

An improved process for the recovery of pure n-alkanols having four to five carbon atoms from hydrogenated oxo reaction mixtures with the separation of substances forming azeotropes by distillation in the presence of water and with simultaneous dehydration to a water content of less than 0.02% by weight in only one column, in which a zone of more than ten theoretical trays having a definite water content is maintained below the feed point, the water content in the said zone being from 25 to 45% by weight, and another zone of at least thirty theoretical trays is maintained above the point of withdrawal of dehydrated n-alkanols and beneath the said first zone, the water content in said second zone decreasing downwardly, and the isoalkanols together with the substances forming azeotropes being separated above the point where the starting mixture is fed in.

Figure 1:
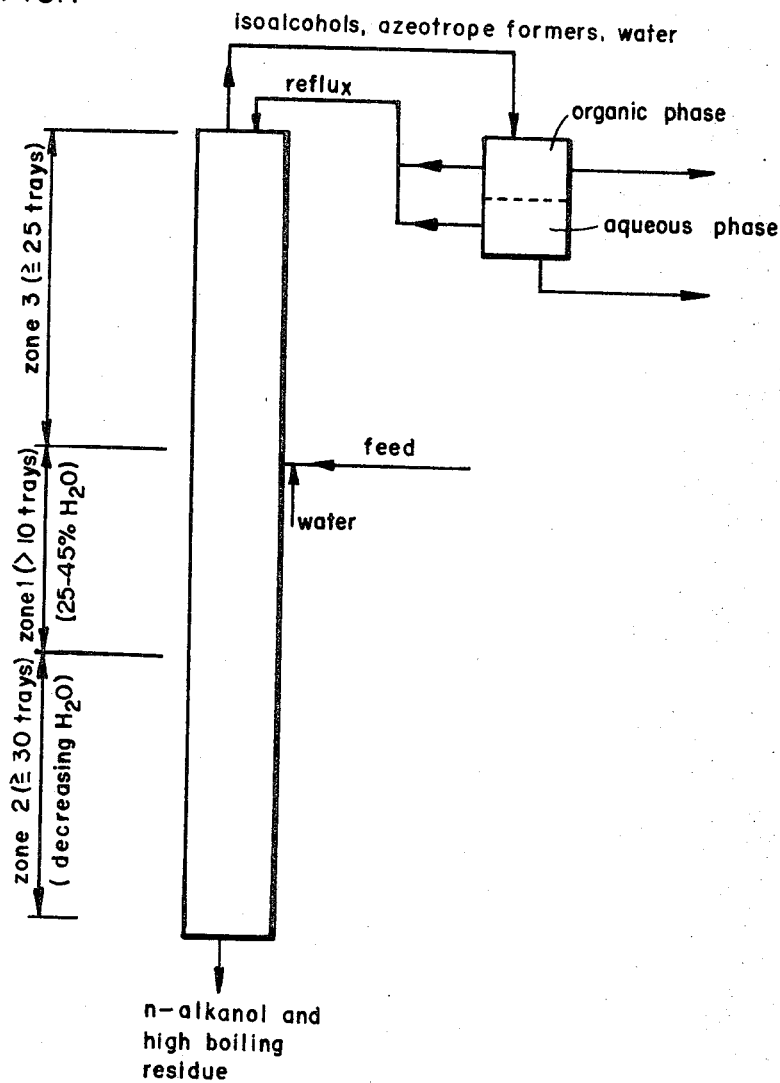

This invention relates to a process for purifying n-alkanols having four to five carbon atoms in a single column.

It is known from U.S. Pat. No. 2,991,232 that pure n-alkanols can be obtained from oxo reaction mixtures by separating the azeotrope-forming substances and the isoalkanols in at least two, preferably three, series-connected columns. Steam is passed into the bottom of the second column. The water content should be less than 10% with reference to the alkanols used. The alkanols are then dehydrated in a third column. This method has the disadvantage that it is very expensive.

It is further known from German Pat. No. 1,213,011 that both the removal of the azeotrope-forming substances and dehydration of the alkanols can be carried out in one column. This method does not always satisfy the requirements placed on the alkanols obtained because the alkanols still contain ketones, particularly diisopropylketone, which cause yellowing in further processing. Moreover, this method gives a mixture of n-alkanols and isoalkanols which has to be separated by fractional distillation.

It is an object of this invention to provide an improved process for the recovery of n-alkanols having four to five carbon atoms from hydrogenated oxo reaction mixtures in which the last traces of ketones are removed to such an extent that they cannot be detected by gas chromatography. It is a further object of the invention to provide an improved process in which the n-alkanols are immediately recovered in pure form.

In accordance with this invention, these and other objects and advantages are achieved in an improved process for the recovery of n-alkanols having four or five carbon atoms from hydrogenated oxo reaction mixtures with separation of azeotrope-forming substances by distillation in the presence of water with simultaneous dehydration to a water content of less than 0.02% by weight in only one column in which a zone of more than ten theoretical trays is maintained below the feed point, wherein the improvement comprises maintaining the water content in the said zone at 25 to 45% by weight, maintaining above the point of withdrawal of the dehydrated n-alkanols and below the said first zone a second zone of at least thirty theoretical trays in which the water content decreases from top to bottom and separating the isoalkanols together with the azeotrope-forming substances above the feed point for the starting mixture.

We have found that n-alkanols having four or five carbon atoms are advantageously obtained from hydrogenated oxo reaction mixtures with separation of azeotrope-forming substances by distillation in the presence of water with simultaneous dehydration to a water content of less than 0.02% by weight in only one column, by maintaining a first zone of more than ten theoretical trays with a definite water content beneath the feed point for the starting mixture, by maintaining in the said first zone a water content of 25 to 45%, maintaining above the point of withdrawal of the dehydrated n-alkanols and below the said first zone a second zone of at least thirty theoretical trays in which the water content decreases from top to bottom, and separating the isoalcohols together with the azeotrope-forming substances above the feed point for the starting mixture.

The new process has the advantage that even the last traces of ketones can be removed so that they cannot be detected by gas chromatography. Moreover the valuable n-alkanols are immediately obtained in pure form.

Starting materials for the process are the mixtures of n-alkanols and isoalkanols containing up to 30%, particularly up to 15%, by weight of water (with reference to the whole mixture) which have been obtained by reacting $C_3$ to $C_4$ olefins with carbon monoxide and hydrogen in the oxo reaction followed by hydrogenation of the oxo reaction mixture. The starting mixture in general contains n-alkanols and isoalkanols in the ratio by weight of from 1:3 to 3:1. The process according to this invention has particular industrial importance in processing mixtures containing n-butanol and isobutanol which have been produced in the said manner and preferably contain n-butanol and isobutanol in the ratio by weight of from 1:2 to 2:1.

The term "azeotrope-forming substances" as used in the present specification denotes substances which form azeotropes with the alkanols to be purified whose boiling points are often near to the boiling points of the pure alkanols. They are hydrocarbons, ethers or ketones. In the case of the purification of n-butanol, they may be compounds which boil between 70° and 155° C. at atmospheric pressure. Examples are di-n-butyl ether, n-butyl isobutyl ether, diisobutyl ether, diisopropyl ketone and $C_7$ to $C_8$ hydrocarbons. In particular diisopropyl ketone, which causes yellowing when pure alkanol is used, may be removed by this process without difficulty. At the same time impurities whose boiling points are low or whose azeotropes with water boil below 90° C. are removed. Examples are aldehydes, such as n-butyraldehyde and isobutyraldehyde, and formates. The azeotrope-forming substances are usually contained in the mixtures to be separated in amounts of up to 8%, particularly up to 3%, by weight with reference to the whole starting mixture.

Although the process according to this invention gives anhydrous n-alkanols, the presence of water is an essential feature of the process according to the invention. It is advantageous to supply the water to the distillation unit together with the mixture to be separated. A first zone having more than ten, preferably twenty to forty, theoretical trays in which the water content is 25 to 45% by weight, advantageously 30 to 40% by weight, is maintained below the point at which the starting mixture is fed in. One would normally have thought that in order to achieve as complete dehydration as possible, a water content below the feed point for the starting mixture should be avoided.

It is moreover essential for the solution of the separation problem that below the said zone having a high water content and above the point of withdrawal of the anhydrous n-alkanols there should be a zone in which the water content declines until the alkanols at the point of withdrawal are practically anhydrous, i.e. have a water content of less than 0.02% by weight. This is achieved by maintaining another zone of at least thirty-five theoretical trays, preferably forty to fifty theoretical trays, in which the water content decreases from the top to the bottom.

The said zone is maintained by appropriate supply of water. The water may be supplied together with the alkanols or separately therefrom into the first of the said zones. The water may be wholly or partly recycled by returning to the column water separated from the distillate.

Maintenance of the two said zones may be checked by providing on the column a number of drain cocks at certain intervals by means of which samples may be taken from time to time so that their composition may be determined by gas chromatography. It is also advantageous to provide thermocouples in the column. Once it has been determined for a given starting mixture what temperature corresponds to a certain composition, the formation of the said zones may be determined simply by reference to the temperatures prevailing along the column.

Moreover it is essential for a solution of the separation problem that all the isoalkanols should be separated with the azeotrope-forming substances above the feed point for the starting mixture, preferably distilling them overhead.

It is advantageous to maintain a zone of at least twenty-five, preferably thirty to fifty, theoretical trays above the point at which the starting mixture is fed in.

The process according to this invention may be carried out with conventional industrial columns. It is advantageous to use sieve columns, bubble tray columns or valve tray columns having for example one hundred to two hundred actual trays. In general the process according to the invention is carried out at atmospheric pressure. The reflux ratio should in general be at least 1:8. It is advantageous to use a reflux ratio of 1:10 to 1:14. The most favorable reflux ratio for oxo reaction mixtures having different fractions of n-alkanols and isoalkanols may be determined by an experiment which is easily carried out.

Figure 2:
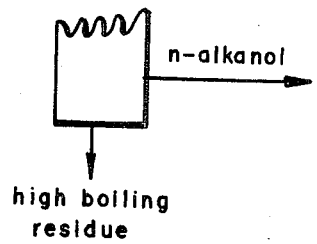

In the drawings:

FIG. 1 is a schematic representation of a distillation column and associated reflux unit with the three zones aforesaid designated schematically thereon; and FIG. 2 is a fragmentary view of the lower portion of the distillation column and illustrating an alternative form for separation of the n-alkanol and high boiling residue.

The invention will be further illustrated in the following example in which the parts specified are parts by weight.

EXAMPLE

The column used is a bubble tray column having 140 actual trays, corresponding to 100 theoretical trays.

332 parts per hour of hydrogenated $C_4$ oxo reaction mixture with 7.17% by weight of water is heated up to boiling temperature and introduced onto the 83rd tray of the column, counting up from the still. 212 parts per hour of anhydrous n-butanol is withdrawn with the residue from the still. The mixture distilling off at the top of the column passes through a separator; of the mixture which distills over, 1050 parts of the organic phase and 227 parts of the aqueous phase are supplied to the column as reflux, while 112 parts of the organic phase and 8 parts of the aqueous phase are withdrawn. The zone below the point of feed comprises 45 actual trays (33 theoretical trays). The water content in this zone is 35% by weight. The zone beneath this comprises 45 actual trays (33 theoretical trays) in which the water content decreases from top to bottom. From the still n-butanol and residue having a water content of 0.02% by weight are withdrawn.

The composition of the individual products is shown in Table 1 in which the following abbreviations are used:

SP=percentage composition of starting product;
ORG=percentage composition of organic phase of distillate;
AQUA=percentage composition of top aqueous phase;
TOTAL=total as a percentage;
REFLUX=amount of reflux in parts by weight;
PROD=percentage of product withdrawn.

The content of water, ethers, formates and ketones on the individual trays is given in Table 2 in which the following abbreviations are used:

i–B=percentage of isobutanol
i–F=percentage of iso-formates
n–F=percentage of normal formates
i–i–E=percentage of iso-iso-ethers
n–i–E=percentage of normal-iso-ethers
n–n–E=percentage of normal-normal-ethers
i–i–K=percentage of iso-iso-ketones
n–i–K=percentage of normal-iso-ketones
n–n–K=percentage of normal-normal-ketones
$H_2O$=percentage water content
tr=trace.

It is desired to separate n-butanol from the residue, it may be withdrawn from the column as a branch stream a few trays above the still.

TABLE 1

|  | SP | Org. | Aqua | Total | Reflux | Prod. |
|---|---|---|---|---|---|---|
| Isobutyraldehyde | Trace | Trace |  |  |  |  |
| n-Butyraldehyde | 0.05 | 0.17 |  | 0.19 | 1.78 |  |
| Isobutanol | 23.10 | 79.81 | 6.10 | 89.88 | 847.86 | 0.01 |
| n-Butanol | 43.97 | 0.39 | 0.24 | 0.46 | 4.62 | 64.62 |
| Isobutyl formate | 0.08 | 0.29 | 0.12 | 0.33 | 3.30 |  |
| n-Butyl formate | 0.16 | 0.60 | 0.15 | 0.68 | 6.61 |  |
| Diisobutyl ether | 0.06 | 0.13 |  | 0.15 | 1.36 |  |
| Butyl isobutyl ether | 0.21 | 0.64 |  | 0.72 | 6.69 |  |
| Di-n-butyl ether | 0.31 | 1.15 |  | 1.29 | 12.02 |  |
| Diisopropyl ketone | 0.09 | 0.40 |  | 0.45 | 4.18 |  |
| Propyl isopropyl ketone | 0.19 | 0.63 |  | 0.71 | 6.58 |  |
| Unknown | 1.45 | 2.79 | Traces | 3.12 | 29.16 | 3.79 |
| Residue | 23.10 |  |  |  |  | 31.56 |
| Water | 7.17 | 13.00 | 93.39 | 22.03 | 347.85 | 0.02 |

TABLE 2

| Tray | i-B | i-F | n-F | i-i-E | n-i-E | n-n-E | i-i-K | n-i-K | n-n-K | °C | H₂O |
|---|---|---|---|---|---|---|---|---|---|---|---|
| 140 | 91.7 | 0.09 | 0.20 | 0.15 | 0.74 | 1.32 | 0.46 | 0.72 | | 89 | 28.0 |
| 139 | 97 | 0.02 | 0.05 | 0.02 | 0.08 | 0.30 | 0.17 | 0.54 | | 89 | |
| 124 | 95.5 | Tr | 0.01 | | 0.01 | 0.08 | 0.07 | 0.24 | | 89 | |
| 112 | 84.0 | | | | 0.01 | 0.07 | 0.05 | 0.20 | | 89 | |
| 94 | 41.7 | | | | 0.02 | 0.03 | 0.02 | 0.06 | | 89 | |
| 85 | (Feed) | | | | | | | | | | |
| 80 | 31.5 | | | | 0.01 | 0.03 | 0.01 | 0.03 | | 89 | |
| 64 | 27.4 | | | | | | | | | 89 | |
| 49 | 22.7 | | | | | | | | | 89 | 35.0 |
| 33 | 14.8 | | | | | | | | | 107 | 2.5 |
| 20 | 3.1 | | | | | | | | | 114 | 0.5 |
| 10 | 0.4 | | | | | | | | | 117 | |
| 2 | 0.15 | | | | | | | | | 128 | 0.02 |

We claim:

1. In a process for the recovery of n-alkanols having four or five carbon atoms from hydrogenated oxo reaction mixtures which contain n-alkanols and isoalkanols in the ratio by weight of 1:3 to 3:1, water up to 30% by weight based on the whole oxo reaction mixture and azeotrope-forming substances comprising diisopropyl ketone and propyl isopropyl ketone up to 8% by weight of said mixture with separation of the azeotrope-forming substances by distillation in the presence of water and with simultaneous dehydration of the recovered n-alkanol to a water content of less than 0.02% by weight in a single column in which, below the point at which the starting mixture is fed in, a zone having a definite water content is maintained over more than ten theoretical trays, wherein the improvement comprises maintaining the water content in the said zone at 25 to 45% by weight of the mixture by controlling the amount of water introduced therein, maintaining above the point of withdrawal of the dehydrated n-alkanol and below the said first zone a second zone of at least thirty theoretical trays in which the water content decreases from top to bottom of said second zone and separating the isoalkanols together with the azeotrope-forming substances at least twenty-five theoretical trays above the point at which the starting mixture is fed in.

2. A process as claimed in claim 1 wherein a starting mixture is used which contains n-butanol and isobutanol in a weight ratio of 1:2 to 2:1, up to 15% by weight of water based on the starting mixture and up to 3% by weight of azeotrope-forming substances based on the starting mixture.

3. A process as claimed in claim 1 wherein beneath the point where the starting mixture is fed into the column a zone is maintained having twenty to forty theoretical trays in which the water content is 30 to 40% by weight.

4. A process as claimed in claim 1 wherein below the first zone in the column a second zone of forty to sixty trays is maintained in which the water content decreases from top to bottom.

5. A process as claimed in claim 1 wherein a zone of thirty to fifty theoretical trays is maintained in the column above the point at which the starting mixture is fed in.

References Cited

UNITED STATES PATENTS

| | | | |
|---|---|---|---|
| 2,551,584 | 5/1951 | Carlson et al. | 203—85 X |
| 2,551,593 | 5/1951 | Gilliland et al. | 203—85 X |
| 2,551,625 | 5/1951 | Morrell et al. | 203—96 X |
| 2,551,626 | 5/1951 | Morrell et al. | 203—85 |
| 2,595,805 | 5/1952 | Morrell et al. | 203—96 |
| 2,638,440 | 5/1953 | Drout et al. | 203—85 |
| 2,681,882 | 6/1954 | Grekel | 260—643 X |
| 2,831,801 | 4/1958 | Beckham, et al. | 260—643 |
| 2,991,232 | 7/1961 | Lamb et al. | 260—643 X |
| 2,591,671 | 4/1952 | Catterall | 203—18 |
| 2,614,971 | 10/1952 | Burton | 203—18 |

FOREIGN PATENTS 1,197,867  8/1965  Germany.

NORMAN YUDKOFF, Primary Examiner

F. E. DRUMMOND, Assistant Examiner

U.S. Cl. X.R.

203—98; 260—643